(12) United States Patent
Shin (10) Patent No.: US 8,996,229 B2
(45) Date of Patent: Mar. 31, 2015

(54) CONSTRUCTION EQUIPMENT INFORMATION-MANAGEMENT SYSTEM AND METHOD USING A COMMUNICATIONS

(75) Inventor: Jung Mug Shin, Gyeonggi-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 150 days.

(21) Appl. No.: 13/141,508

(22) PCT Filed: Dec. 7, 2009

(86) PCT No.: PCT/KR2009/007255
§ 371 (c)(1),
(2), (4) Date: Jun. 22, 2011

(87) PCT Pub. No.: WO2010/074427
PCT Pub. Date: Jul. 1, 2010

(65) Prior Publication Data
US 2011/0257831 A1 Oct. 20, 2011

(30) Foreign Application Priority Data

Dec. 23, 2008 (KR) ........................ 10-2008-0131818

(51) Int. Cl.
G06F 7/00 (2006.01)
G06F 15/16 (2006.01)
G06Q 10/06 (2012.01)
G06Q 50/08 (2012.01)

(52) U.S. Cl.
CPC .............. *G06Q 10/06* (2013.01); *G06Q 50/08* (2013.01)
USPC ........................................ 701/29; 340/426.1

(58) Field of Classification Search
CPC .................................. G06Q 50/08; G07C 5/008
USPC ........ 701/29, 29.1, 30, 31.5, 32.3, 32.4, 32.5, 701/34.4, 50; 340/426.1, 426.18, 426.22, 340/431, 438, 455, 457.4
See application file for complete search history.

(56) References Cited

U.S. PATENT DOCUMENTS 7,283,810 B1 * 10/2007 Arakawa et al. ........... 455/414.1
7,536,243 B2   5/2009 Kakizawa et al.
(Continued)

FOREIGN PATENT DOCUMENTS

CN  1527993 A  9/2004
CN  1937529 A  3/2007
(Continued)

OTHER PUBLICATIONS

Office Action dated Sep. 5, 2012 for Chinese Patent Application No. 200980152165.8, 8 pages.
(Continued)

*Primary Examiner* — Mary Cheung
*Assistant Examiner* — Rodney Butler
(74) *Attorney, Agent, or Firm* — John D. Veldhuis-Kroeze; Westman, Champlin & Koehler, P.A.

(57) ABSTRACT

The present disclosure relates to a system and a method for information management of a construction machinery using a communication terminal mounted on the construction machinery. To this end, the information management system of the construction machinery of the present disclosure includes: a control server managing information of the construction machinery; a memory unit storing driving information of the construction machinery when the construction machinery is in a starting off state; and a communication terminal reading the corresponding information from the memory unit and transmitting the information to the control server when receiving a request for predetermined information from the control server.

9 Claims, 3 Drawing Sheets

(56) References Cited

U.S. PATENT DOCUMENTS

| | | |
|---|---|---|
| 7,643,938 B2 | 1/2010 | Adachi et al. |
| 2004/0004540 A1* | 1/2004 | Komatsu et al. ......... 340/426.18 |
| 2005/0124315 A1* | 6/2005 | Kageyama et al. ........... 455/403 |
| 2008/0012695 A1* | 1/2008 | Herschell et al. ............. 340/431 |
| 2008/0071470 A1* | 3/2008 | Hasegawa et al. ........... 701/207 |

FOREIGN PATENT DOCUMENTS

| | | | | |
|---|---|---|---|---|
| JP | 08-178649 | A | | 7/1996 |
| KR | 10-2003-0019656 | A | | 3/2003 |
| KR | 10-2004-0011597 | A | | 2/2004 |
| KR | 2005048068 | A | * | 5/2005 |

OTHER PUBLICATIONS

Search Report dated Jul. 13, 2010 for International Application No. PCT/KR2009/007255, filed Dec. 7, 2009.

DDaily "South Korea location, industry, heavy equipment tracking system developed ," pp. 1-3, http://www.ddaily.co.kr/news/news_view.php?uid=4284; Google translation attached and available at: http://translate.google.com/translate?hl=en&sl=ko&tl=en&u=http%3A%2F%2Fwww.ddaily.co.kr%2Fnews%2Fnews_view.php%3Fuid%3D4284 (last visited Jun. 20, 2011).

* cited by examiner

CONSTRUCTION EQUIPMENT INFORMATION-MANAGEMENT SYSTEM AND METHOD USING A COMMUNICATIONS

This application is a Section 371 National Stage application of International Application No. PCT/KR2009/007255, filed Dec. 7, 2009 and published, not in English, as WO2010/074427 on Jul. 1, 2010.

FIELD OF THE DISCLOSURE

The present disclosure relates to an information management system of a construction machinery, and more particularly, to a system and a method for remotely managing information of a construction machinery using a communication terminal mounted on the construction machinery when the construction machinery is in a start-off state.

BACKGROUND OF THE DISCLOSURE

In general, in a remote management system for a construction machinery, a communication terminal connected with a vehicle control device of the construction machinery such as an excavator, a wheel loader, or the like transmits information of the construction machinery to a control server by using a mobile communication network or a satellite communication network, and the control server stores and manages the information of the construction machinery.

The information of the construction machinery includes rpm (radius per minute), battery voltage, the temperature of cooling water, the temperature of oil, on/off sensing information of various switches, on/off sensing information of solenoids or relays, error information (error code), an operation time for each operation mode, an engine operation time, a filter/oil using time, the pressures of a pump and a cylinder, fuel information, load rate information, positional information, and the like of the machinery.

At present, the information of the construction machinery is transmitted at a predetermined cycle when the construction machine is in a start-on state. Further, when the control server needs predetermined information of the construction machinery, the control servers requests the needed information of the construction machinery to the communication terminal and the communication terminal that receives the request requests the needed information to a machinery control device of the construction machinery and thereafter, receives and transmits the corresponding information to the control server.

As described above, transmission and reception of needed data between the construction machinery and a control station can be made only when the construction machinery is in the start-on state and when the construction machinery is in a start-off state, the communication terminal cannot access the machinery control device.

As a result, a method capable of managing the information of the machinery even in the start-off state is required.

The discussion above is merely provided for general background information and is not intended to be used as an aid in determining the scope of the claimed subject matter.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Accordingly, the present disclosure relates to a system and a method for information management of a construction machinery that can manage information of the construction machinery which is in a start-off state, by using a communication terminal mounted on the construction machinery.

In order to achieve the object, an information management system of the construction machinery according to the present disclosure includes: a control server managing information of the construction machinery; a memory unit storing driving information of the construction machinery when the construction machinery is in a starting off state; and a communication terminal reading the corresponding information from the memory unit and transmitting the information to the control server when receiving a request for predetermined information from the control server.

Further, according to the exemplary embodiment of the present disclosure, the system may further include a construction machinery providing anti-theft information and range setting information to the communication terminal when an anti-theft alarm and range setting is performed by an operator, and the communication terminal may receive and store the anti-theft alarm and range setting information, and when a current position received from a GPS satellite deviates from the anti-theft range, the communication terminal may transmit the position, movement velocity, and route information of the construction machinery to the control server at a predetermined cycle.

In addition, according to the exemplary embodiment of the present disclosure, the communication terminal may store a moving trace depending on the positions of the construction machinery during a predetermined period as moving trace data and transmit the stored moving trace data in accordance with a request for the moving trace data from the control server.

Moreover, according to the exemplary embodiment of the present disclosure, the communication terminal may detect the voltage of a regular power battery when the construction machinery is in the starting off state, and switch a power use mode to use the regular power battery to a backup battery use mode to use a backup battery when the voltage of the regular power battery is abnormally decreased or the battery voltage reaches a stop voltage level.

In addition, according to the present disclosure, in a system for information management of the construction machinery including a communication terminal communicating information of the construction machinery with a control server, the information stored in the construction machinery is transferred to and stored in the communication terminal mounted on the communication construction machinery when the construction machinery is in a starting off state, and when a request for the information is received from the control server, the stored information is read and transmitted to the control server.

Further, according to the present disclosure, the request for transmission of the information from the control server may be arbitrarily selected information and the information read and transmitted to the control server may be the arbitrarily selected information.

Moreover, according to the exemplary embodiment of the present disclosure, the arbitrarily selected information may be anti-theft alarm and range setting information, and the communication terminal may receive and store the anti-theft alarm and range setting information, and when the current position received from the GPS satellite deviates from the anti-theft range, the communication terminal may transmit the position, movement velocity, and route information of the construction machinery to the control server at a predetermined cycle.

Besides, according to the exemplary embodiment of the present disclosure, the communication terminal may store a moving trace depending on the positions of the construction machinery during a predetermined period as moving trace data and transmit the stored moving trace data in accordance with a request for the moving trace data from the control server.

In addition, according to the exemplary embodiment of the present disclosure, the method may further include: detecting, the communication terminal, the voltage of a regular power battery when the construction machinery is in the starting off state, and switching a power use mode to use the regular power battery to a backup battery use mode to use a backup battery when the voltage of the regular power battery is abnormally decreased or the battery voltage reaches a stop voltage level.

By Means for Solving the Problem described above, a control server can receive information of a construction machinery at any time regardless of a start-on/off state of the construction machinery. As such, the control server can receive the information of the construction machinery at any time, but requires data only at the time when the information is needed, thereby making it possible to save a communication cost.

Further, a communication terminal manages information regarding a past error history provided to the control server on the basis of an operation time or an actual time of the construction machinery, thereby making it possible to prevent data from being redundantly transmitted.

DETAILED DESCRIPTION

Hereinafter, exemplary embodiments of the present disclosure will be described in detail with reference to the accompanying drawings. It should be noted that the same components refer to the same reference numerals anywhere as possible in the drawings. In the following description, specific detailed matters will be described and are provided to the more overall understanding of the present disclosure. Further, in describing the present disclosure, well-known functions or constructions will not be described in detail since they may unnecessarily obscure the understanding of the present disclosure.

First, a configuration of an information management system of a construction machinery according to an exemplary embodiment of the present disclosure will be described with reference to FIG. 1.

Figure 1:
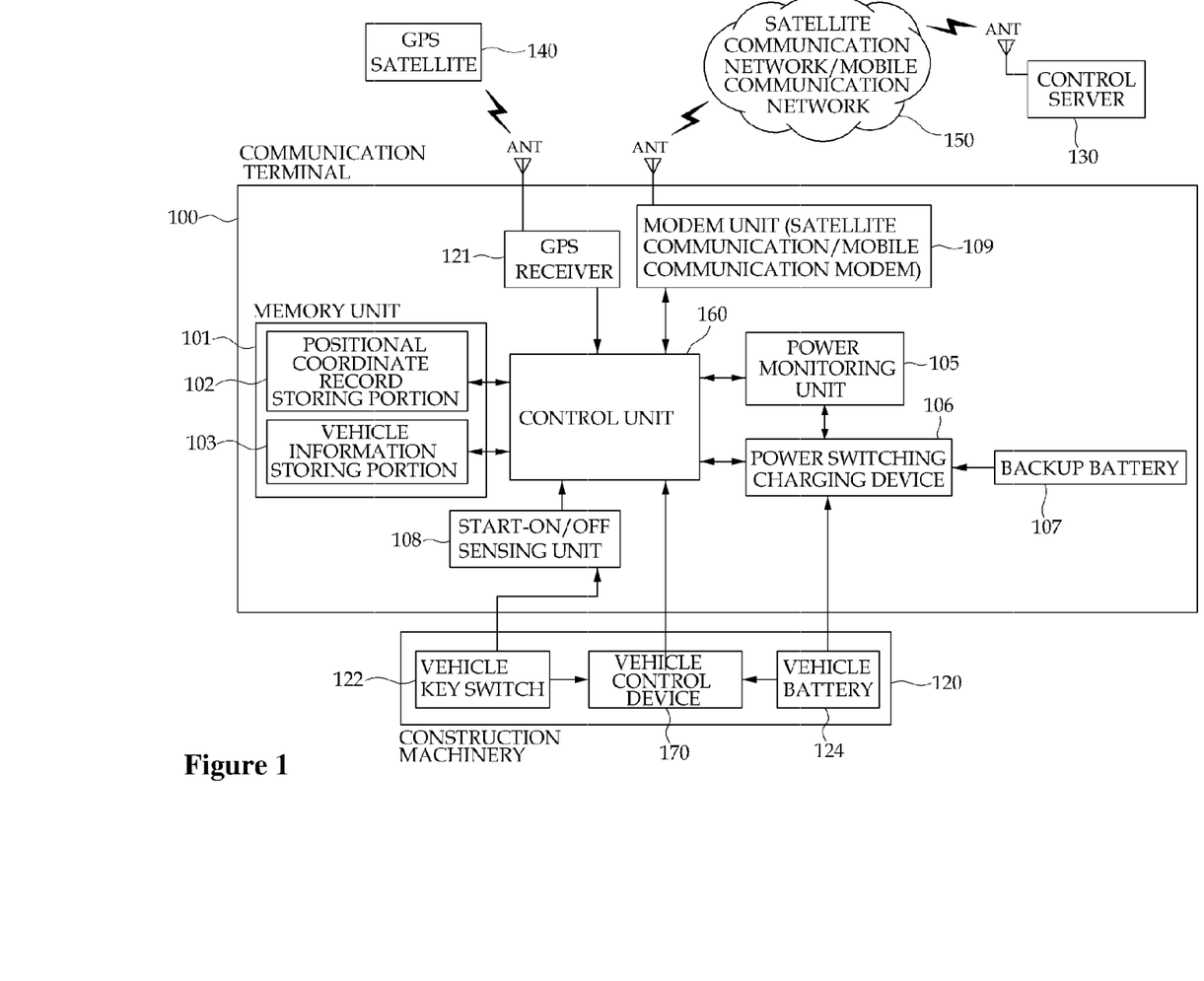
FIG. 1 is a configuration diagram of a system for information management of a construction machinery according to an exemplary embodiment of the present disclosure.

Referring to FIG. 1, the information management system of the construction machinery includes a communication terminal 100 mounted on a construction machinery 120 and a control server 130 remotely managing construction machineries, and the communication terminal 100 communicates with the control server 130 through a satellite communication network or mobile communication network 150. Further, the communication terminal 100 receives a satellite signal from a GPS satellite 140 to recognize a current position.

First, the control server 130 will be described. The control server 130 transmits/receives data to and from the communication terminal 100 through the satellite communication network or mobile communication network 150. Further, when a manager or a machinery owner requests verification of predetermined information of the construction machinery, the control server 130 requests the corresponding information to the communication terminal 100 to receive the corresponding information.

Next, the communication terminal 100 will be described. The communication terminal 100 includes a memory unit 101, a power monitoring unit 105, a power-switching charging device 106, a backup battery 107, a start-on/off sensing unit 108, a modem unit 109, a GPS receiver 121, and a control unit 160.

The memory unit 101 includes a positional coordinate record storing portion 102 and a vehicle information storing portion 103.

The positional coordinate record storing portion 102 stores moving trace information of the construction machinery 120 during a predetermined period and when receiving a request for the moving trace information from the control server 130, the positional coordinate record storing portion 102 reads the corresponding information from the memory unit 101 and transmits the information to the control server 130. At this time, the moving trace information represents information acquired by storing positions calculated by using a GPS signal received through the GPS receiver 121 in real time. Further, when a moving trace data deletion command is transmitted from the control server 130, moving trace data other than data before a predetermined period (e.g., before one day) from the present time is deleted.

The vehicle information storing portion 103 receives and stores the information stored in the construction machinery 120. At this time, the stored information may include various error histories and state histories in addition to the types and numbers of the construction machineries.

In addition, the memory unit 101 stores a flag indicating whether an anti-theft alarm set by an operator is set and stores an anti-theft alarm range for judging theft. The anti-theft alarm range may be changed within an initially set range. Further, a theft notification transmitting cycle set to transmit information regarding the position, movement velocity, and route of the vehicle is stored at the time of setting the anti-theft alarm.

In addition, the memory unit 101 stores an information transmission cycle set to increase a communicatable time when a power use mode to use a regular power battery is switched to a backup battery use mode to use a backup battery.

The power monitoring unit 105 notifies to the control unit 160 that the power use mode is switched to the backup battery use mode when an event in which the power use mode to the regular power battery is switched to the backup battery use mode to use the backup battery occurs. At this time, the event in which the power use mode should be switched to the backup battery use mode represents a situation in which the voltage of the battery is abnormally rapidly decreased by detecting the voltage of the regular power battery or the battery voltage reaches around a stop voltage level.

In accordance with the control of the control unit 160, the power-switching charging device 106 switches to use the backup battery 107 as a power supply of the communication terminal 100 in accordance with a signal for using the backup battery 107 as the power supply of the communication terminal 100, and switches to use a vehicle battery 124 as the power supply of the communication terminal 100 in accordance with a signal for using the vehicle battery 124 as the power supply of the communication terminal 100.

The start-on/off sensing unit 108 senses an on/off state of a vehicle key switch 122 to output a start-on/off state sensing signal to the control unit 160.

The modem unit 109 may include at least one of a modem for transmitting and receiving data through the mobile communication network and a modem for transmitting and receiving data through the satellite communication network.

The control unit 160 senses the start-on/off state through the start-on/off sensing unit 108, and when sensing the start-off state, the control unit 160 receives and stores the information of the construction machinery stored from the vehicle control device 170 and controls the stored information of the construction machinery to be transmitted to the control server 130 in accordance with the request for the predetermined information of the construction machinery from the control server 130. Further, when the start-on state is sensed again, the stored information of the construction machinery is deleted.

Lastly, the construction machinery 120 will be described. The construction machine 120 includes the vehicle key switch 122, the vehicle control device 170, and the vehicle battery 124.

Hereinafter, an operation of the construction machinery 120 configured as above will be described. When the start-off state is sensed through the vehicle key switch 122 in the construction machinery 120, the stored information is transferred to and stored in the communication terminal 100 mounted on the construction machinery 120 and when the control server 130 requests a request for transmission of the information, the stored information is read and transmitted to the control server 130. At this time, the request for transmission of the information from the control server 130 is arbitrarily selected information and the information read and transmitted to the control server is arbitrarily selected information.

Further, the arbitrarily selected information may be anti-theft alarm and range setting information.

If the arbitrarily selected information is the anti-theft alarm and range setting information, the communication terminal 100 receives and stores the anti-theft alarm and range setting information, and when the current position received from the GPS satellite deviates from the anti-theft range, the communication terminal 100 transmits the position, movement velocity, and route information of the construction machinery to the control server 130 at a predetermined cycle.

Further, the communication terminal stores a moving trace depending on the position of the construction machinery 120 during a predetermined period as moving trace data and transmits the stored moving trace data according to a request for the moving trace data from the control server 130.

In addition, the communication terminal detects the voltage of the regular power battery through the vehicle battery 124 when the construction machinery 120 is in the start-off state, and when the voltage of the regular power battery is abnormally decreased or the battery voltage reaches the stop voltage level, the power use mode to use the regular power battery is switched to the backup battery use mode to use the backup battery.

Hereinafter, an operation of the communication terminal 100 depending on the start-on/off state of the construction machinery 120 according to an exemplary embodiment of the present disclosure will be described with reference to FIGS. 2 and 3.

Figure 2:
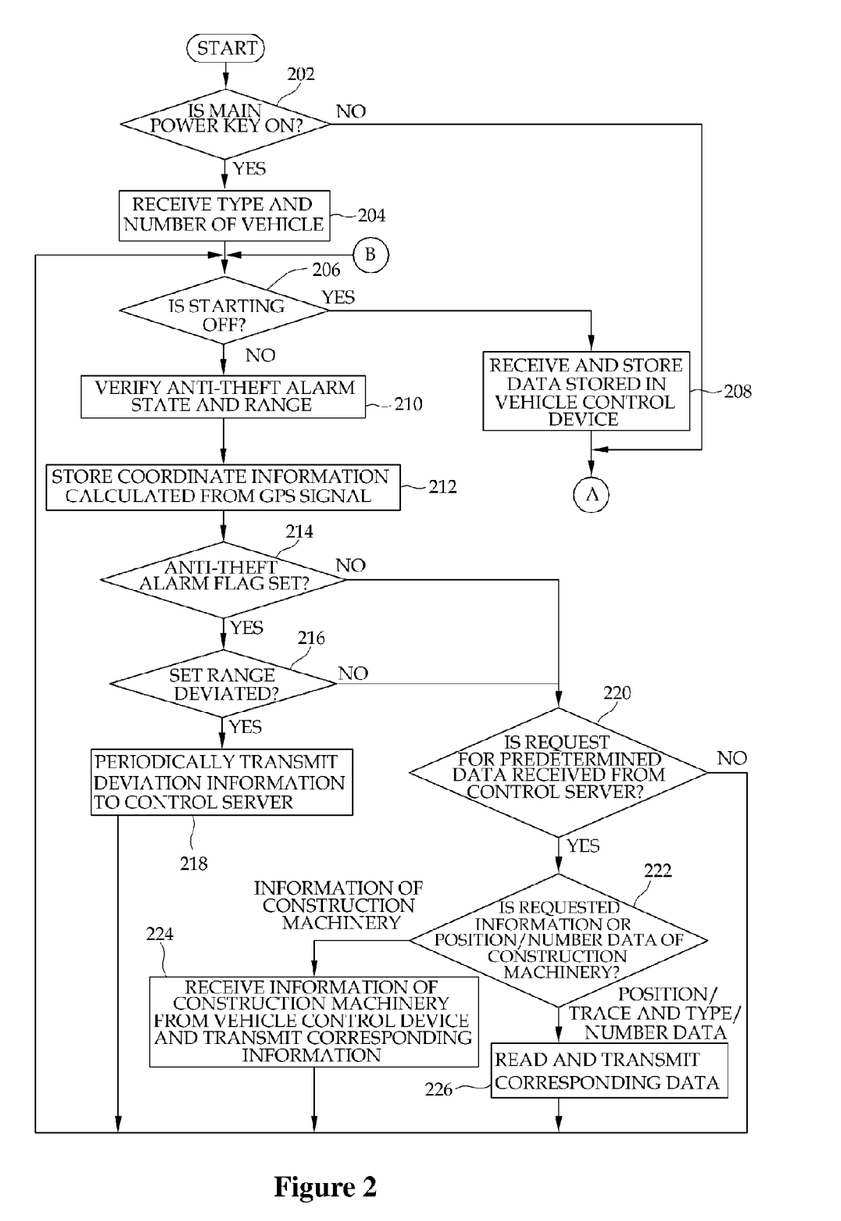
FIGS. 2 and 3 are flowcharts showing a process of managing information of a construction machinery by using a communication terminal according to an exemplary embodiment of the present disclosure.
Figure 3:
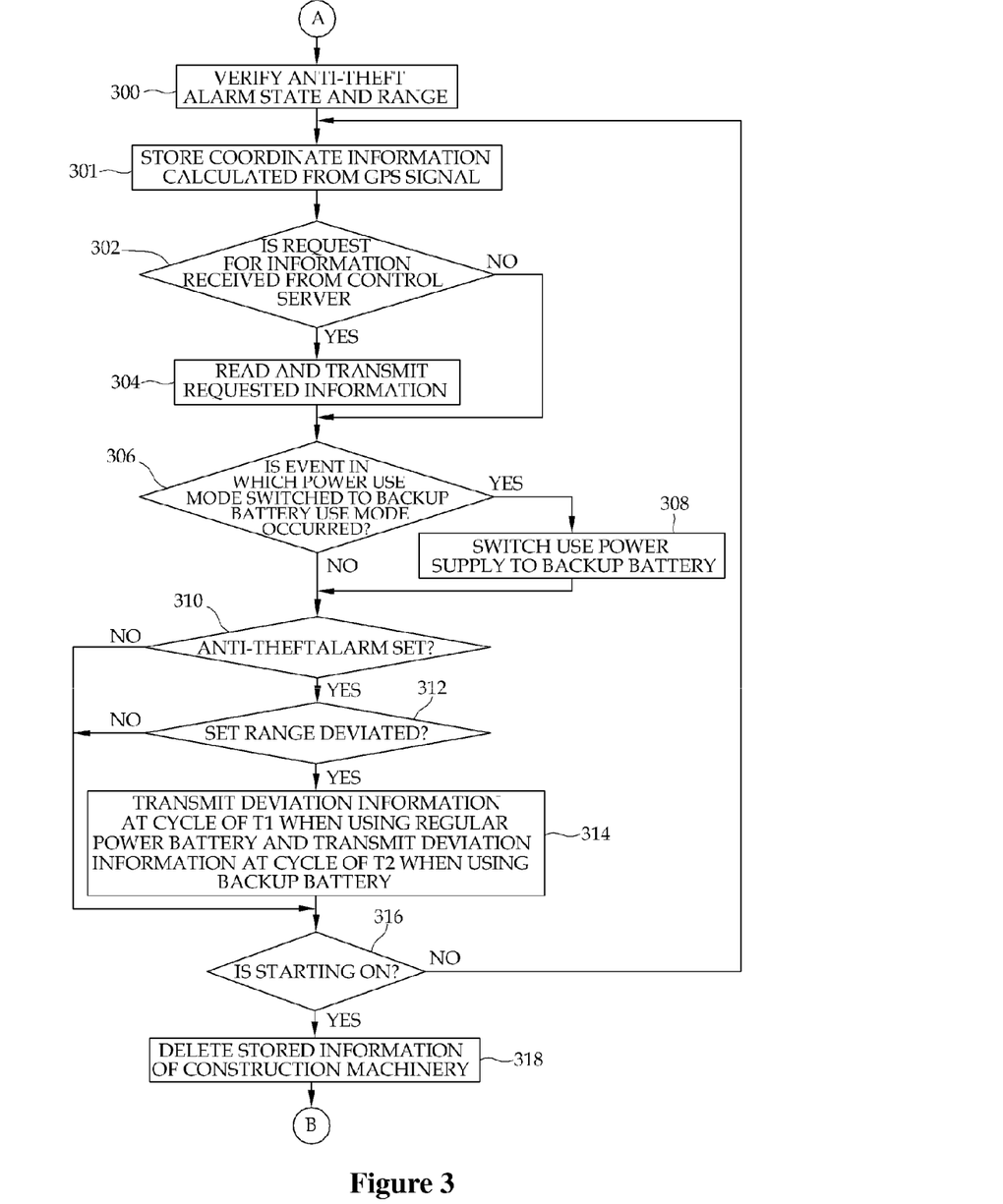

First, referring to FIG. 2, in step S202, it is examined through the start-on/off sensing unit 108 whether starting is on as the vehicle key switch is turned on. If it is sensed that starting is on, the process proceeds to step S204 and a vehicle type and a vehicle number are received.

Thereafter, in step S206, it is examined through the start-on/off sensing unit 108 whether starting is off as the vehicle key switch is off. If it is sensed that staring is off, the process proceeds to step S208 and data stored in the vehicle control device are received and stored, and thereafter, the process proceeds to (A), and if not, the process proceeds to step S210.

When the process proceeds to step S210, the control unit 160 verifies a state and a range of anti-theft alarm, and in step S212, coordinate information calculated from the GPS signal received through the GPS receiver 121 is stored.

In step S214, the control unit 160 examines whether an anti-theft alarm flag is set. If the anti-theft alarm flag is set, the process proceeds to step S216 and it is examined whether the anti-theft alarm deviates from the set range, and if not, the process proceeds to step S220.

At this time, the anti-theft alarm and the anti-theft range can be set through an instrument panel of the construction machinery, and when the anti-theft alarm is set, a flat recognizing that the anti-theft alarm is set is set and the range is stored in the communication terminal 100. Further, when the anti-theft alarm is cancelled through the instrument panel, the communication terminal 100 clears the anti-theft alarm flag.

Meanwhile, as a result of the examination of step S216, when it is judged that the anti-theft alarm deviates from the set range, the process proceeds to step S218 and it is judged that there is a theft danger, and the position, movement velocity, and route of the vehicle are transmitted to the control server 130 at a predetermined theft notification transmitting cycle. By this configuration, the control server 130 enables the movement route of the construction machinery to be determined and provides the information to a vehicle owner, which can easily recover the vehicle even when the vehicle is thieved.

In step S220 performed in steps S214 and S216, the control unit 160 examines whether or not to receive a request for predetermined data from the control server 130. If the request for the predetermined data is received from the control server 130, the process proceeds to step S222 and it is examined whether the requested data is the construction machinery information or position/trace and type/number data.

If the requested data is the construction machinery information or position/trace and type/number data, the process proceeds to step S226 and the corresponding data is read by the memory unit 101 and transmitted to the control server 130 and thereafter, the process proceeds to step S206. However, if the requested data is the construction machinery information, the process proceeds to step S224 and the corresponding information is requested and received from the vehicle control device 170, and transmitted to the control server 130 and thereafter, the process proceeds to step S206.

Meanwhile, as a result of the examination of step S206, when it is sensed that starting is off, the process proceeds to step S208 and the data stored in the vehicle control device is received and stored and thereafter, the process proceeds to (A).

Steps following (A) will be described below with reference to FIG. 3. In step S300, the control unit 160 verifies the state and range of the anti-theft alarm, and in step S301, the coordinate information calculated from the GPS signal received through the GPS receiver 121 is stored.

Thereafter, the control unit 160 examines whether predetermined information is requested from the control server 130, and when the information is requested, the process proceeds to step S304 and the requested information is read from the memory unit 101 and transmitted to the control server 130 and thereafter, the process proceeds to step S306, and if not, the process proceeds directly to step S306.

In step S306, the control unit 160 examines whether the event in which the power use mode to use the regular power battery should be switched to the backup battery use mode occurs. At this time, as described above, the event in which the power use mode should be switched to the backup battery use mode may represent a situation in which the voltage of the battery is abnormally rapidly decreased by detecting the voltage of the regular power battery or the battery voltage reaches around a stop voltage level.

If the event occurs, the process proceeds to step S308 and the use power supply is switched to and used as the backup battery and thereafter, current position and state are transmitted to the control server 130. By this configuration, the control server 130 notifies that a battery exchanging time has arrived to an A/S personnel or the vehicle owner and makes it possible to exchange or charge the battery at the appropriate time, thereby preventing not starting due to discharge or superannuation of the battery at the time of intending to use the vehicle after leaving the vehicle alone for a long time.

Further, when the communication terminal 100 operates by the backup battery, the data transmission cycle is changed to a cycle previously set at the time of using the backup battery in order to increase the communicatable time and the type of communicating data is also limited only by the type, number, and positional information.

Meanwhile, in step S310, the control unit 100 examines whether the anti-theft alarm flag is set. If the anti-theft alarm flag is set, the process proceeds to step S312 and it is examined whether the anti-theft alarm deviates from the set range, and if not, the process proceeds to step S316.

In step S312, the control unit 100 examines the deviation of the set range, and if the anti-theft alarm deviates from the set range, the process proceeds to step S314, and when the regular power battery is being used, the control unit transmits deviation information at a predetermined cycle T1 at the time of using the regular power battery, and when the backup battery is being used, the control unit transmits the deviation information at a predetermined cycle T2 at the time of using the backup battery. At this time, the deviation information may be the type, number, and positional information.

Meanwhile, in step S316 performed in steps S310, S312, and S314, the control unit 100 examines whether starting is on and thereafter, when starting is on, the process proceeds to step S317.

That is, when starting of the construction machinery 120 is on, the communication terminal 100 performs communication to verify whether the vehicle control device 170 is normal, and when receiving a response indicating that the vehicle control device 170 is normal from the vehicle control device 170, the communication terminal 100 deletes the information of the construction machinery stored in step S317 from the memory unit 101.

Thereafter, when receiving the information request signal of the construction machinery from the control server 130, the communication terminal 100 performs only a bridge role of transmitting the request signal to the vehicle control device 170 and transmitting the signal received from the vehicle control device 170 to the control server 130.

When starting of the construction machinery 120 is off, data presently recorded in the construction machinery are all stored in the communication terminal 100, and as a result, information can be provided at any time when past stored information that is not received by the control server 130 is required.

Further, the communication terminal 100 manages information regarding a past error history provided to the control server 130 on the basis of an operation time or an actual time of the construction machinery, thereby making it possible to prevent data from being redundantly transmitted.

In addition, since the data of the vehicle can be ensured at any time in the control server 130, a communication cost can be saved by requiring the data only when the information is required.

As described above, although certain exemplary embodiments of the present disclosure has been described in detail, it is to be understood by those skilled in the art that the spirit and scope of the present disclosure are not limited to the certain exemplary embodiments, but are intended to cover various modifications and changes without departing from the gist.

Accordingly, since the above-mentioned exemplary embodiments are provided to inform those skilled in the art of the scope of the present disclosure, it should be understood that they are exemplary in all aspects and not limited and the present disclosure is just defined by the scope of the appended claims.

The present disclosure can be applied to a system for managing information of a construction machinery.

The invention claimed is:

1. A system for information management of a construction machinery using a communication terminal communicating with a control server to manage information of the construction machinery, the system comprising:
a start-on/off sensing unit adapted to sense an on/off state of a vehicle key switch to output a start-on/off state sensing signal to a control unit;
a memory unit of the communication terminal adapted to store driving information of the construction machinery, which is acquired when the construction machinery is switched into a starting-off state from a starting-on state, when receiving the start-on/off state sensing signal, wherein the starting-off state turns off the previously started starting-on state; and
the communication terminal adapted to read the corresponding information from the memory unit, to obtain data stored in the memory unit just before the construction machinery is switched into the starting-off state from the starting-on state, and transmit the information to the control server when receiving a request for predetermined information from the control server.

2. The system for information management of a construction machinery using a communication terminal communicating with the control server of claim 1, further comprising:
wherein the control server provides anti-theft alarm information and range setting information to the communication terminal when an anti-theft alarming and range setting is performed by an operator,
wherein the communication terminal receives and stores the anti-theft alarm and range setting information, and when a current position received from a GPS satellite deviates from an anti-theft range, the communication terminal transmits at least one of the position, movement velocity, and route information of the construction machinery to the control server at a predetermined cycle.

3. The system for information management of a construction machinery using a communication terminal communicating with the control server of claim 1, wherein the communication terminal stores a moving trace depending on the positions of the construction machinery during a predetermined period as moving trace data and transmits the moving trace data stored in accordance with a request for the moving trace data from the control server.

4. The system for information management of a construction machinery using a communication terminal communicating with the control server of claim 1, wherein the communication terminal detects the voltage of a regular power battery when the construction machinery is in the starting-off state, and switches a power use mode to use the regular power battery to a backup battery use mode to use a backup battery when the voltage of the regular power battery is abnormally decreased or the battery voltage reaches a stop voltage level.

5. A method for managing information on a construction machinery, the method comprising:
   acquiring and storing, using a communication terminal mounted on the construction machinery, the information from the construction machinery,
   wherein the information is acquired when the construction machinery is switched into a starting-off state, from a previously started starting-on state to turn off the starting-on state, such that the communication terminal obtains data from the construction machinery from just before the construction machinery is switched into the starting-off state from the starting-on state;
   receiving, using the communication terminal, a request for the information from a control server; and
   transmitting the stored information from the communication terminal to the control server.

6. The method of claim 5, wherein the request for the information from the control server is for arbitrarily selected information and the information read and transmitted to the control server is the arbitrarily selected information.

7. The method of claim 5, further comprising:
   detecting, using the communication terminal, the voltage of a regular power battery when the construction machinery is in the starting-off state, and
   switching a power use mode to use the regular power battery to a backup battery use mode to use a backup battery when the voltage of the regular power battery is abnormally decreased or the battery voltage reaches a stop voltage level.

8. The method of claim 6, wherein the arbitrarily selected information is anti-theft alarm and range setting information, and the communication terminal receives and stores the anti-theft alarm and range setting information and when the current position received from the GPS satellite deviates from the anti-theft range, the communication terminal transmits at least one of the position, movement velocity, and route information of the construction machinery to the control server at a predetermined cycle.

9. The method of claim 8, wherein the communication terminal stores a moving trace depending on the position of the construction machinery during a predetermined period as moving trace data and transmits the stored moving trace data in accordance with a request for the moving trace data from the control server.

* * * * *

UNITED STATES PATENT AND TRADEMARK OFFICE
CERTIFICATE OF CORRECTION

| | | |
|---|---|---|
| PATENT NO. | : 8,996,229 B2 | Page 1 of 1 |
| APPLICATION NO. | : 13/141508 | |
| DATED | : March 31, 2015 | |
| INVENTOR(S) | : Jung Mug Shin | |

It is certified that error appears in the above-identified patent and that said Letters Patent is hereby corrected as shown below:

On the title page, item (54) and in the specification, column 1, line 1, should read:

--CONSTRUCTION EQUIPMENT INFORMATION-MANAGEMENT SYSTEM AND METHOD USING A COMMUNICATIONS TERMINAL MOUNTED ON THE CONSTRUCTION EQUIPMENT--

Signed and Sealed this
Eleventh Day of August, 2015

Michelle K. Lee
*Director of the United States Patent and Trademark Office*